INVENTOR.
HARRY REIFEL
BY Robert J. Palmer
Attorney

Jan. 11, 1949.    H. REIFEL    2,458,735
ELECTRIC PRESSURE AND DEFLECTION GAUGE
Filed Nov. 8, 1946    2 Sheets-Sheet 2

INVENTOR.
Harry Reifel
BY
Robert T. Palmer
Attorney

Patented Jan. 11, 1949

2,458,735

UNITED STATES PATENT OFFICE 2,458,735

ELECTRIC PRESSURE AND DEFLECTION GAUGE

Harry Reifel, Waltham, Mass., assignor, by mesne assignments, to Stevens-Arnold Inc., Boston, Mass., a corporation of Massachusetts Application November 8, 1946, Serial No. 708,684

6 Claims. (Cl. 201—48)

This invention relates to instruments for the indication of, and the measure of, pressures and deflections.

Gauges for the measure of pressures and deflections which apply motion to fulcrumed resistance slide levers have been proposed, but such instruments have had the disadvantages that they have had too much back-lash in their lever mechanisms, resulting in inaccuracy, and have not been sufficiently responsive to very small motions.

This invention provides a gauge which may be used for the measurement of infinitesimally small pressures and deflections, and in the mechanism of which there is no observable back-lash. The gauge acts to vary the resistance in an electric circuit, requiring but a source of current and a meter, and is as sensitive and as accurate but is far less expensive, than other available gauges requiring complicated electric circuits using vacuum tube oscillators and amplifiers.

Objects of the invention are to provide an accurate, sensitive and inexpensive gauge for the measurement of pressures and/or deflections.

The invention will now be described with reference to the drawing, of which:

Figures 1, 2, 3, 4, 5, 6:
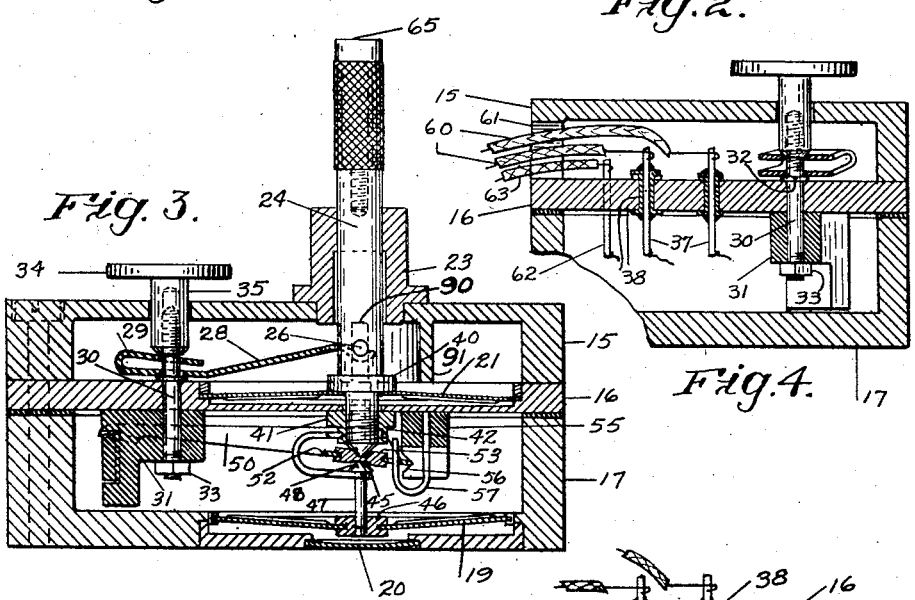
Fig. 1 is a plan view looking downwardly upon the pressure or deflection pick-up of a gauge embodying this invention.
Fig. 2 is a side elevation of the pick-up of Fig. 1.
Fig. 3 is an enlarged section along the lines 3—3 of Fig. 1.
Fig. 4 is an enlarged section along the lines 4—4 of Fig. 1.
Fig. 5 is an enlarged plan view of the lower diaphragm chamber of the pick-up.
Fig. 6 is an enlarged section through the resistance wire supporting block and the intermediate wall of the pick-up adjacent same, and illustrates the connections of the ends of the resistance wire to terminals seated in the wall.
Figure 7:
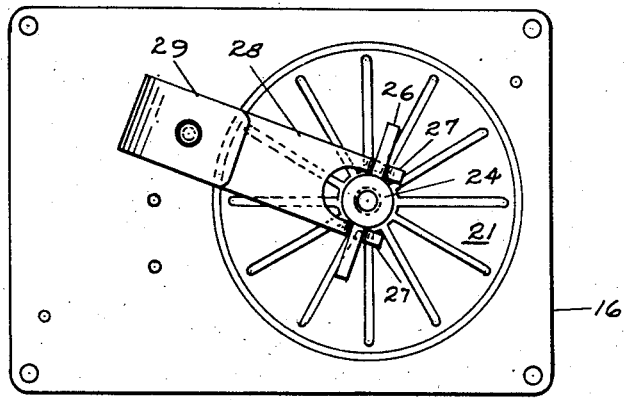
Fig. 7 is a plan view of the upper side of the intermediate wall of the pick-up.
Figure 8:
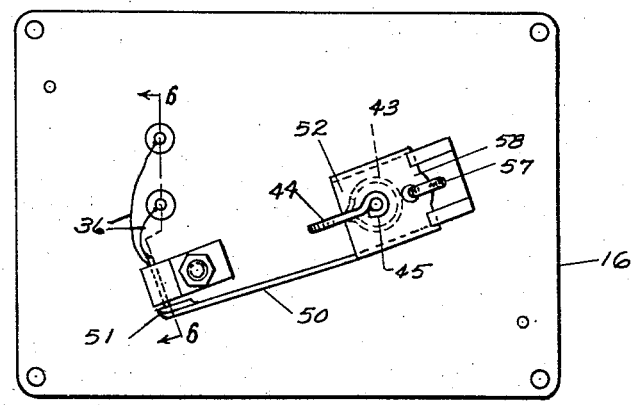
Fig. 8 is a plan view of the lower side of the intermediate wall.

The embodiment of the invention illustrated, includes the upper housing wall 15, the intermediate wall 16 and the lower housing wall 17, the walls being connected together for sealing the pick-up mechanism, by the screws 18 extending through apertures in the corners of the walls 15 and 16, and threaded into the corners of the lower wall 17.

The lower wall 17 has supported in a circular opening therein, the flexible, resilient diaphragm 19, the central portion of the diaphragm being accessible through a circular opening in which is sprung the disc 20.

The intermediate wall 16 has supported in a circular opening therein, a diaphragm 21 similar to the diaphragm 19 and aligned therewith when the pick-up is assembled.

The upper wall 15 has a circular opening therein in axial alignment with the diaphragms 19 and 21, and in which is secured the bushing 23, which has a central opening through which the plunger 24 extends.

The plunger 24 has the rod 26 extending therethrough in the space between the walls 15 and 16, and which is seated upon the spaced portions 27 which straddle the plunger 24, of one end of the spring 28. The rod 26 is movable lengthwise of the plunger, in the slots 90 in the cylindrical, inner extension 91 of the upper wall, but is held against rotation by the sides of the slots whereby the plunger 24 is held against rotation. The other end 29 of the spring 28 is folded over and has an opening therein through which the threaded bolt 30 passes.

The bolt 30 also passes through openings in the wall 16 and in the block 31 of electric insulating material. The bolt 30 has a flange 32 thereon which rests upon the upper surface of the wall 16, and has the nut 33 threaded thereon against the block 31.

The thumb screw 34 has a cylindrical shaft portion 35 which extends through a circular opening in the upper wall 15, and which is screwed upon the threaded upper end of the bolt 30, and which contacts the folded end 29 of the spring 28. Adjustment of the thumb screw 34 changes the pressure of the spring 28 through the rod 26, on the plunger 24 causing more or less resistance, depending upon the direction of adjustment, to the inner movement of the plunger as will be described.

The block 31 has a pair of spaced slits formed therein, and in which are press fitted the resistance wire 35 as best illustrated by Fig. 6. The ends of the wire 35 are connected by the leads 36 to the terminals 37 which extend through the insulators 38 embedded in openings in the wall 16.

The plunger 24 has a flange 40 formed thereon and which is seated upon the upper surface of the diaphragm 21. The lower end of the plunger is threaded and has screwed thereon the nut 21 having a cylindrical lower portion 42 of reduced diameter, having a groove in which is tightly fitted the ring 43 formed at one end of the member 44 of piano wire. The other end of the member 44 terminates in a ring 45 of reduced diameter, the rings 43 and 45 being axially aligned with the plunger 24 and the axes of the diaphragms 19 and 21.

The diaphragm 19 has a central opening in which is pressed the circular member 46 having a central opening in which is held the lower end of the pin 47.

The pin 47 extends through the ring 45 and its upper end has a cone shaped enlargement 48, the base of which rests upon the ring 45, and the apex of which is slightly rounded.

The metal lever 50 has an outer end 51 which contacts the resistance wire 35, and has a base portion 52 with a circular aperture therethrough in which is pressed the circular member 53 which has rounded depressions in the centers of its upper and lower surfaces. The apex of the cone shaped enlargement 48 on the upper end of the pin 47, is fitted in the lower, rounded depression in the member 53. The lower end of the plunger 24 is cone shaped and its apex is slightly rounded where it is fitted into the upper, rounded depression in the member 53.

The lower surface of the wall 16 has the block 55 formed therein and which has the V-shaped recesses 56 in the angles of which the inner end of the lever formed as a knife edge, is fitted. The block 55 has an aperture therein parallel to the axis of the plunger 24, and in which is held one end of the U-shaped spring 57 of piano wire. The other end of the spring 57 is fitted into an aperture 58 in the base portion 52 of the lever 50. The spring 57 serves to hold the sharp inner end of the lever 50 in the angles of the V-shaped recesses 56 in the block 55.

The V-shaped recesses 56 serve to pivot the sharp inner edge of the lever 50 and to serve as the fulcrum thereof.

The member 44 serves through the rings 43 and 45 formed at its ends, to hold the upper end of the pin 47 in the center of the rounded depression in the lower surface of the member 43.

The pins 37 which are connected to the ends of the resistance wire 35, are connected by the leads 60 which extend through the opening 61 in the upper wall 15 for connecting the resistance wire in meter circuits as will be described. The lever 50 and the elements it contacts, are of metal, and the lead 63 which is connected to the pin 62 which is embedded in the metal wall 16 and grounded thereto, serves to connect the contact portion 51 of the lever 50 in meter circuits as will be described.

The contact portion 51 of the lever 50 serves as the contact slider of a potentiometer of which the wire 35 forms the resistor. In the position illustrated by Figs. 3 and 6, the contact portion 51 is at the extreme upper end of the wire 35 whereby all of the resistance of the wire will be in the associated meter circuit.

As movement caused by pressure from a source of pressure or movement caused by deflection of a member the deflection of which it is desired to measure, is applied to the upper end 65 of the plunger 24, the pick-up housing being restrained against movement, the plunger will be moved inwardly in the pick-up a distance equal to the applied movement. The inner end of the plunger moves inwardly against the restraint of the diaphragms 19 and 21 and moves the lever 50 about the described fulcrum at its inner end causing magnified movement of its outer contact portion 51, and causing the portion 51 to move along the wire 35 a distance proportional to the external applied movement, and thereby causing proportional decrease of the resistance in the associated meter circuit. As the applied external displacement is reduced, the diaphragms 19 and 21 will cause the lever 50 and the plunger 24, to retract in accordance therewith, and to cause the resistance in the meter circuit to be increased accordingly.

The knife edge fulcrum in the angles of the V-shaped recesses 56, and the conical portions of the inner ends of the plunger 24 and of the pins 47, together with the diaphragms 19 and 21, result in the lever 50 following, and amplifying the movement of the plunger, without back-lash and lost motion.

The spring 28 and its associated adjusting thumb screw 34 are provided for regulating the resistance to movement of the plunger 24 in accordance with the strength of the force applying movement to the plunger. For weak forces the resistance to inward movement of the plunger can be adjusted by backing off the thumb screw and thereby reducing the pressure of the spring 28 against movement of the plunger.

The resistance wire 35 may be of Constantan, Advance or of other suitable metals. The lever 50 and the leads 36 preferably are silver.

Figure 9:
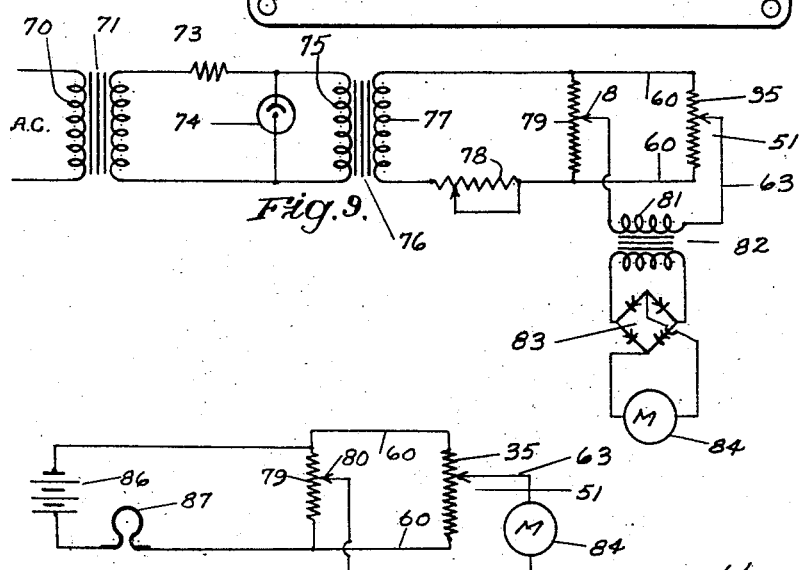
Fig. 9 is a circuit schematic illustrating the connection of the variable resistance elements of the pick-up to a meter in an alternating current electric circuit.

Fig. 9 illustrates an alternating current energized circuit with which the described pick-up can be used. Line voltage is applied to the primary winding 70 of the transformer 71, the secondary winding 72 of which is connected to the current stabilizing resistor 73 and the voltage regulator 74, and to the primary winding 75 of the transformer 76. The secondary winding 77 of the transformer 76 has the current adjusting resistor 78 and the potentiometer 79 is connected to one side of the primary winding 81 of the impedance matching transformer 82, the other side of the winding 81 being connected to grounded lead 63 of the pick-up. The leads 60 from the pick-up are connected to the ends of the potentiometer 79. The secondary winding 83 of the transformer 82 is connected to the rectifier bridge 83, the rectified output of which is connected to the rectifier bridge 83, the rectified output of which is connected to the meter 84 which may be a micro-ammeter or a milli-ammeter.

The resistance of the wire 35 is varied by the deflection of the plunger of the pick-up as described in the foregoing, and in turn varies the voltage applied to the primary winding of the transformer 82. The transformer 82 is a step-up transformer for matching the relatively low resistance of the wire 35 to the relatively high resistance of the meter 84. Its output is rectified by the rectifier 84 and causes the indicator of the meter to move across its scale a distance proportional to the displacement of the plunger of the pick-up by the pressure or deflection to be measured.

The resistor 78 is provided for adjustment of the sensitivity of the meter 84. Thus by adjusting the current in the circuit by the resistor 78, the meter can, for example, be adjusted to give a full scale deflection for a pick-up plunger movement of 1/30000 of an inch or a pick-up plunger movement of 1/1000 of an inch.

The potentiometer 79 and the wire 35 are connected in a bridge circuit to the primary of the transformer 82 and to the secondary of the transformer 76. Adjustment of the slider 80 of the potentiometer 79 enables the indicator of the meter 84 to be returned to zero reading for any position of the contact portion 51 of the lever 50 of the pick-up, on the resistance wire 35.

Figure 10:
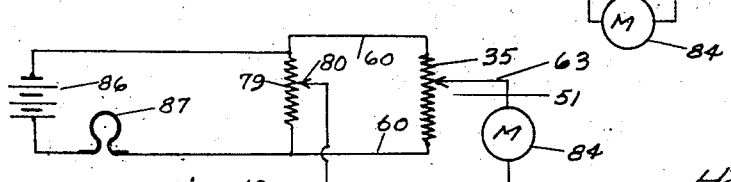
Fig. 10 is a circuit schematic illustrating the connection of the variable resistance elements of the pick-up to a meter in a circuit energized by a battery.

Fig. 10 illustrates a battery energized meter current for the pick-up in which the battery 86 supplies current through the Amperite current regulator 87 to the bridge circuit including the potentiometer 79 and the resistance wire 35. The meter 84 is connected directly to the sliders 80 and 51. The regulator 87 maintains the current in the circuit constant for maintaining the sensitivity of the meter constant. For different sensitivities different currents would be maintained. The regulator 87 could be replaced by a variable resistor such as the resistor 78 of Fig. 10 if it is desired readily to adjust the sensitivity of the meter in the circuit of Fig. 10.

While one embodiment of the invention has been described for the purpose of illustration, it should be understood that the invention is not limited to the exact apparatus, arrangement of apparatus, and meter circuits illustrated, as modifications thereof may be suggested by those skilled in the art, without departure from the essence of the invention.

What is claimed is:

1. A gauge for indicating movements, comprising a plunger adapted to contact a source of movement; a resilient diaphragm extending centrally around said plunger and in contact with same so as to restrain the movement thereof; a lever fulcrumed at one end and carrying an electric contact adjacent its other end, said lever having aligned, rounded depressions in its opposite sides intermediate its ends, the inner end of said plunger being in contact with the rounded surface of one of said depressions; a second resilient diaphragm in axial alignment with said diaphragm, a pin carried at one end by said second diaphragm at the center thereof, said pin having its other end rounded at its point of contact with the surface of the other of said depressions, and a resistance wire touching said contact, said contact being adapted to be moved along said wire by movement of said plunger, said diaphragms opposing said movement.

2. A gauge as claimed in claim 1 in which the fulcrumed end of the lever has a thin edge held in a V-shaped recess in a fulcrum member.

3. A gauge for indicating movements, comprising a housing having end walls and an intermediate wall; a plunger adapted to contact a source of movement journalled in one of the end walls; a resilient diaphragm seated at its peripheral edge in said intermediate wall; a second resilient diaphragm seated at its peripheral edge in the other of said end walls, said diaphragms being axially aligned with said plunger, said plunger extending through said first mentioned diaphragm and contacting same so as to have its movement restrained thereby; a lever between said diaphragms, said lever being fulcrumed at one end and carrying a contact adjacent its other end; a pin carried at one end by said second diaphragm, and contacting the adjacent side of said lever with its other end, the inner end of said plunger contacting the side of said lever opposite said adjacent side, and a resistance wire touching said contact, said contact being adapted to be moved along said wire by movement of said plunger, said diaphragms opposing said movement.

4. A gauge as claimed in claim 3 in which the lever contacting ends of said pin and plunger are rounded and the sides of the lever contacted thereby have rounded depressions at the points of contact.

5. A gauge as claimed in claim 3 in which the fulcrumed end of said lever is relatively thin and is held by a spring in the angle of a V-shaped recess in a fulcrum block.

6. A gauge as claimed in claim 3 in which the lever contacting ends of said pin and plunger are rounded and the sides of the lever contacted thereby have rounded depressions at the points of contact, and in which the fulcrumed end of the lever is relatively thin and is held by a spring in the angle of a V-shaped recess in a fulcrum block.

HARRY REIFEL.

REFERENCES CITED

The following references are of record in the file of this patent:

UNITED STATES PATENTS

| Number | Name | Date |
|---|---|---|
| 2,384,894 | Curtis | Sept. 18, 1945 |